United States Patent Office 2,838,555
Patented June 10, 1958

2,838,555

GROUP II METAL SALTS OF A MIXTURE OF SIMPLE DIESTERS OF DITHIOPHOSPHORIC ACIDS

Fred Corwin Goldsmith, Painesville, Ohio, assignor to The Lubrizol Corporation, Wickliffe, Ohio, a corporation of Ohio No Drawing. Application October 12, 1951
Serial No. 251,139

11 Claims. (Cl. 260—429.9)

This invention relates to new compositions of matter, and more particularly pertains to novel, oil-soluble, dithiophosphate materials which include particularly the dithiophosphoric acid di-esters and the salts derived from them.

At present it is known that dithiophosphoric acid di-esters (hereinafter designated as "dithiophosphate acid-esters") can be produced by reacting a hydroxy compound such as an aliphatic alcohol with $P_2S_5$, in appropriate relative amounts. The resultant product may be further reacted with a salt-forming reagent to produce a dithiophosphate salt-ester. These salt-esters can be used for a variety of purposes, but one main use is in lubricating oils. For this purpose, it is required that the salt-ester be permanently oil-soluble, and generally, since it is known that the organic radicle must have a sufficient number of carbon atoms in order to have an oil-solubilizing effect, it will be found that these salt-esters are usually prepared from high molecular weight hydroxy compounds such as long chain aliphatic alcohols and alkyl-substituted cycloaliphatic alcohols.

The amount of dithiophosphate salt-esters used for lubricant improvement purposes is very substantial. As a result, it is desired to produce these materials as cheaply as possible. Various prior art workers have conducted extensive research programs in an effort to reduce the cost of effective salt-esters, and recent developments emphasize decreasing the "molecular weight" of the organic substituents in the salt-ester to the permissible limit governed by oil solubility considerations. This technique at first glance appears plausible, because the high molecular weight hydroxy compounds are costly, and by using lower molecular weight hydroxy compounds, the cost might be reduced to a more attractive level.

This technique has been tried by me to the extent of reducing the number of carbon atoms in the organic substituents in the salt-ester to six. Obviously the cost of manufacturing such materials is less; but unfortunately certain of such materials do not have satisfactorily permanent solubility in a variety of mineral lubricating oils as indicated by sedimentation after long periods of standing. This sedimentation was even more pronounced as the molecular weight of the substituent was further decreased, and in some cases, the material was initially oil-insoluble in substantially all proportions. After continued and prolonged investigation, it was quite unexpectedly discovered in accordance with the present invention that exceptionally stable oil-soluble salt-ester materials could be produced by having present in the material a substantial proportion of each of: (1) radicals of at least six carbon atoms, and (2) radicals of less than six carbon atoms. On the basis of oil solubility, there was no apparent reason to justify obtaining stable oil-soluble salt-esters by having present in the material radicals of less than six carbon atoms, because it was recognized in the art that oil solubility improves as the molecular weight of the substituent is increased.

Oil-soluble dithiophosphate salt-esters are particularly suited as corrosion and oxidation inhibitors in lubricating oils. After having unexpectedly found that stable, oil-soluble salt-esters could be economically produced in this novel way, another program was conducted to determine the effectiveness of the new salt-ester materials as corrosion inhibitors. The result of this undertaking quite unexpectedly showed that in order to obtain the same corrosion-inhibiting effect of a high molecular weight hydrocarbon-substituted salt-ester, it actually took a smaller amount on a weight basis of the novel salt-esters of this invention. This discovery is extremely important, because salt-esters are sold on a weight basis for use in lubricants.

Therefore, it is now possible, by means of the present invention to provide novel salt-ester materials which are economical to produce and are also more effective than the heretofore known oil-soluble salt-esters as corrosion inhibitors in lubricants, on a given weight basis.

It is therefore an object of the present invention to provide novel, stable, oil-soluble dithiophosphate salt-ester materials.

Another object of the present invention is to provide novel, stable, oil-soluble dithiophosphate salt-ester materials which contain aliphatic radicals of less than six carbon atoms.

Other objects of the present invention will be apparent as the description proceeds.

In its broadest sense, the present invention is concerned with novel compositions of matter comprising an oil-soluble organic dithiophosphate material, in which material there is present a substantial proportion of each of: (1) aliphatic radicals having less than six carbon atoms, and (2) organic radicals having at least six carbon atoms and preferably selected from the group consisting of aliphatic and cycloaliphatic radicals. It should be understood for the purposes of this invention that "organic dithiophosphate" includes generically the dithiophosphoric acid di-esters and the salts derived from them. Likewise by the word "material" it is meant to include (a) a single mixed compound, i. e. one in which the two organic substituents attached to the same phosphorus atom are different; (b) a mixture of different simple compounds; i. e. compounds in which the two organic substituents attached to the same phosphorus atom are the same; (c) a mixture of one or more simple compounds with one or more mixed compounds; (d) complex salt compounds in which the radicals derived from two or more dissimilar dithiophosphoric acid di-esters are attached to a single divalent metal; and (e) mixtures of complex salts, or at least one complex salt in admixture with any of the compounds under (a), (b), and (c) above.

More specifically, the present invention is concerned with novel compositions of matter comprising an oil-soluble material consisting of at least one compound having the formula $$\mathrm{RO-\overset{\overset{\displaystyle S}{\|}}{\underset{\underset{\displaystyle OR'}{|}}{P}}-SX}$$

in which R is a hydrocarbon radical selected from the class consisting of alkyl and cyclo-alkyl radicals, R' is an organic radical which may be the same as R, and X is selected from the group consisting of hydrogen and one equivalent of a salt-forming element or radical; and in which material there is a substantial proportion each of: (a) alkyl radicals having less than 6 carbon atoms, and (b) hydrocarbon radicals having at least six carbon atoms selected from the class consisting of alkyl and cycloalkyl radicals.

The organic dithiophosphate material in general will preferably contain from about 10 to about 90% of aliphatic hydrocarbon substituents having less than six

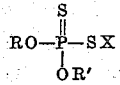

carbon atoms and from about 90 to about 10% of radicals selected from the class consisting of aliphatic and cycloaliphatic hydrocarbon radicals having at least six carbon atoms. More usually, the material will contain from about 30 to about 50% of radicals having less than six carbon atoms and from about 70 to 50% of radicals having at least six carbon atoms. When the dithiophosphate materials of the present invention are used as lubricant additives, best results will usually be secured when the average number of carbon atoms per phosphorus atom is in the range of from 8 to 9.6.

The mixed compounds can be illustrated by the following structural formula:

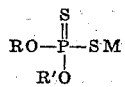

wherein M is either hydrogen or one equivalent of a salt-forming radical; R is an aliphatic hydrocarbon radical of less than six carbon atoms and R' is a radical different from R and selected from aliphatic and cycloaliphatic hydrocarbon radicals of at least six carbon atoms.

The salt-forming radical can be monovalent or polyvalent, such as the metals of group II of the periodic table of elements.

Specific examples of mixed compounds are as follows: zinc (isopropyl) (methylcyclohexyl) dithiophosphate, calcium (ethyl) (octyl) dithiophosphate, barium (butyl) (lauryl) dithiophosphate, cadmium (isopropyl) (4-methyl-pentyl-2) dithiophosphate, magnesium (amyl) (hexyl) dithiophosphate, mercuric (isobutyl) (amyl-cyclohexyl) dithiophosphate, calcium (sec-butyl) (nonyl) dithiophosphate, barium (isopropyl) (capryl) dithiophosphate, strontium (ethyl) (octadecyl) dithiophosphate, magnesium (isoamyl) (heptyl) dithiophosphate, cadmium (isopropyl) (decyl) dithiophosphate, mercuric (sec-butyl) (eicosyl) dithiophosphate, calcium (propyl) (heneicosyl) dithiophosphate, zinc (ethyl) (docosyl) dithiophosphate, barium (sec butyl) (tricosyl) dithiophosphate, calcium (isopropyl) (lauryl) dithiophosphate, cadmium (isobutyl) (cetyl) dithiophosphate, etc.

Another dithiophosphate material involves a mixture of simple compounds in which from about 10 to 90% of the simple compounds contain less than twelve carbon atoms and from about 10 to 90% contain at least twelve carbon atoms. Examples of such mixtures are illustrated in the following table:

Table I

| Ex. No. | Dithiophosphate salt esters wherein each of the hydrocarbon radicals contains at least 6 carbon atoms. | Percentage of radicals | Dithiophosphate salt esters wherein each of the hydrocarbon radicals contains less than 6 carbon atoms. | Percentage of radicals |
| --- | --- | --- | --- | --- |
| 1 | Zinc di-capryl dithiophosphate. | 60 | Zinc di-isopropyl dithiophosphate. | 40 |
| 2 | Calcium di-(methylcyclohexyl) dithiophosphate. | 65 | Calcium di-butyl dithiophosphate. | 35 |
| 3 | Magnesium di-hexyl dithiophosphate. | 70 | Strontium di-amyl dithiophosphate. | 30 |
| 4 | Cadmium di-heptyl dithiophosphate. | 55 | Calcium di-ethyl dithiophosphate. | 45 |
| 5 | Cadmium di-nonyl dithiophosphate. | 50 | Barium di-propyl dithiophosphate. | 50 |
| 6 | Zinc di-decyl dithiophosphate. | 53 | Magnesium di-sec. butyl dithiophosphate. | 47 |
| 7 | Strontium di-lauryl dithiophosphate. | 68 | Zinc di-propyl dithiophosphate. | 32 |
| 8 | Barium di-(butyl-cyclohexyl) dithiophosphate. | 63 | Zinc di-amyl dithiophosphate. | 37 |
| 9 | Cadmium di-hexyl dithiophosphate. Zinc di-(methyl-cyclohexyl). | 40 25 | Barium di-isopropyl dithiophosphate. Zinc di-butyl dithiophosphate. | 20 15 |
| 10 | Mercuric di-(amyl-cycloxyl) dithiophosphate. Strontium di-eicosyl dithiophosphate. | 35 35 | do Zinc di-amyl dithiophosphate. | 15 15 |
| 11 | Calcium di-lauryl dithiophosphate. | 60 | Calcium di-ethyl dithiophosphate. | 40 |

The complex salt compounds can be derived from simple compounds and/or mixed compounds. This is readily possible because the dithiophosphate acid esters are monovalent, whereas the metallic radicals of this invention are divalent. These complex salt compounds can be used alone or in admixture with mixed compounds, single compounds or mixtures of mixed and single compounds. The complex salt compounds can be best illustrated by the following general formula:

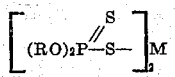

wherein the hydrocarbon radicals in at least one

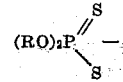

configuration are different from those in a second such configuration, M is a divalent metallic radical. Examples of such complex salts are: Calcium di-isopropyl dithiophosphate-di-hexyl dithiophosphate, barium-di-butyl dithiophosphate-di-capryl dithiophosphate, magnesium-di-ethyl dithiophosphate-di-(methyl-cyclohexyl) dithiophosphate, strontium-di-amyl dithiophosphate-di-lauryl dithiophosphate, mixture of zinc-di-isopropyl dithiophosphate-di-sec. butyl dithiophosphate and cadmium-di-nonyl dithiophosphate-di-cyclohexyl dithiophosphate, cadmium-di-decyl dithiophosphate-di-amyl dithiophosphate, strontium-di-(propylcyclohexyl) dithiophosphate-di-isopropyl dithiophosphate, zinc-di-cetyl dithiophosphate-di-propyl dithiophosphate, zinc diceryl dithiophosphate-di-ethyl dithiophosphate, barium-di-eicosyl dithiophosphate-di-isopropyl dithiophosphate, barium-di-ethyl dithiophosphate-di-nonyl dithiophosphate, and calcium-di-methyl dithiophosphate-di-(ethyl-cyclohexyl) dithiophosphate.

Another dithiophosphate material which can be used is comprised of mixtures of one or more simple compounds and one or more mixed compounds or mixtures of mixed compounds. The following table of specific examples illustrates this concept.

Table II

| Ex. No. | Simple compounds | Percentage of radicals | Mixed compounds | Percentage of radicals |
| --- | --- | --- | --- | --- |
| 1 | Zinc di-(hexyl-cyclohexyl) dithiophosphate. | 55 | Zinc (ethyl) (propyl) dithiophosphate. | 45 |
| 2 | Zinc di-lauryl dithiophosphate. | 20 | Barium (nonyl) (octyl) dithiophosphate. | 45 |
| 3 | Strontium di-amyl dithiophosphate. | 30 | Calcium (decyl) (ethyl) dithiophosphate. | 70 |
| 4 | Magnesium di-(methylcyclohexyl) dithiophosphate. | 60 | Cadmium (propyl) (butyl) dithiophosphate. | 40 |
| 5 | Cadmium di-butyl dithiophosphate. | 47 | Calcium (isopropylcyclohexyl) (eicosyl) dithiophosphate. | 53 |
| 6 | Zinc di-capryl dithiophosphate. | 30 | Mercuric (amyl-cyclohexyl) (methyl-cyclohexyl) dithiophosphate. | 33 |
| 7 | Magnesium di-isopropyl dithiophosphate. | 43 | Barium (hexyl) (heptyl) dithiophosphate. | 57 |
| 8 | Cadmium di-lauryl dithiophosphate. | 68 | Strontium (ethyl) (amyl) dithiophosphate. | 32 |
| 9 | Zinc di-ethyl dithiophosphate. | 50 | Zinc (cyclohexyl) (cetyl) dithiophosphate. | 50 |
| 10 | Calcium di-isopropyl dithiophosphate. Zinc di-butyl dithiophosphate. | 21 10 | Barium (cetyl) (ceryl) dithiophosphate. Calcium (eicosyl) (nonyl) dithiophosphate. | 32 37 |

The preparation of the dithiophosphate salt-ester material is accomplished by at least one of the following methods:

(1) The reaction of $P_2S_5$ with a mixture of alcohols, and subsequently reacting the resultant mixture with the desired basic reagent;

(2) First preparing simple acids by the separate reaction of $P_2S_5$ with each of the desired alcohols; mixing two or more of such simple acids together and then reacting the mixture with the desired basic reagent;

(3) First preparing simple acids by the separate reaction of $P_2S_5$ with each of the desired alcohols; then reacting separately each of the simple acids with the desired basic reagent, followed by mixing the desired salts together;

(4) The mixed acids of method (1) above are mixed with the simple acids of method (2) above, and then the resultant mixture is reacted with the desired reagent; and (5) The simple salts of method (3) above are mixed with the mixed salts of methods (1) above.

The methods (1) and (2) above are preferred from a commercial standpoint because such methods require less equipment and the preparation of high molecular weight salts in situ with low molecular weight salts yields homogeneous liquid products.

There are available at least two processes by which the dithiophosphate acid esters are prepared, namely the batch process and the circulatory process. While I shall set forth in detail how each of said two processes may be carried out, I do this only for purpose of illustration and do not intend that my invention should be limited thereby. Any other suitable methods for the production of dithiophosphoric acid di-esters can be employed if it is so desired.

In the batch process, about 3 to 6 moles, preferably about 4 to 5 moles of an alcohol are placed in a reaction vessel equipped with a stirring device, and one mole of finely divided $P_2S_5$ is added. The mixture is stirred for about one to six hours at about 40° to 100° C. At the end of the reaction period, the product may be decanted, filtered, or centrifuged to remove any solid or unreacted materials which may be present.

In the circulatory process, the desired alcohol or mixture of alcohols is heated, for example, with a heat exchanger to a temperature of about 40° to 100° C., and then circulated or passed to a reaction chamber filled with small lumps of $P_2S_5$, in the order of about ¼" to 1" in diameter. The liquid leaving the reaction chamber is passed to a receiver or collecting sump, from which the collected liquid can be again circulated or passed to the reaction chamber. The recirculation of liquid to the reaction chamber is continued until the product in the receiver or collecting pump has the desired acid number. Thereafter, the process is discontinued in order to remove all of the product, and then the process is resumed with a fresh batch of alcohol or mixture of alcohols. In this process the amount of $P_2S_5$ placed in the reaction chamber should be at least equal to the stoichiometric amount required to react with the alcoholic reactant, and is preferably present in considerable excess, for example, amounts of about 125 to 500% or more of the stiochiometric quantity. A large excess of $P_2S_5$ not only accelerates the reaction, but makes possible the production of several batches of dithiophosphate acid ester without replenishing the $P_2S_5$ in the reaction chamber.

In determining the amount or percentage of dithiophosphate acid ester in the product, a reasonable approximation is made on the basis of the acid number of the product. By knowing the composition of the alcohol or mixture of alcohols, the theoretical acid number of the dithiophosphate acid ester is calculated on the basis of the following equation:

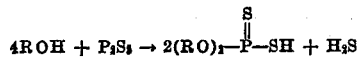

Having the theoretical acid number, the approximate percentage of dithiophosphate acid ester which is present in the product is determined by taking the actual acid number of the product and dividing it by the theoretical acid number and then multiplying by 100. This percentage value is for convenience termed hereinafter as the "conversion value." This conversion value is approximate and not the exact figure, because of small amounts of acidic by-products formed, dissolved $H_2S$ and/or $P_2S_5$. The conversion value can be as low as 5 by stopping the reaction in a short time, but usually it will be in the order of about 70 to 100, when using the preferred relative amounts of reactants, namely about 4 to 5 moles of alcoholic reactant and 1 mole of $P_2S_5$, permitting the reaction to go to substantial completion.

In preparing the salts of the dithiophosphate acid esters, a salt forming material is reacted with (a) a mixed acid, or (b) a mixture of two or more simple acids, or (c) a mixture of one or more simple acids with one or more mixed acids. When the metal salt is desired, the salt-forming reagent can be the metal itself or compounds of the metal, for example, the oxides, hydroxides, carbonates, bicarbonates, sulfides, hydrosulfides, alcoholates, hydrides, etc. The hydroxides and oxides are preferred for the salt-forming reaction, because of their satisfactory reactivity, cheapness and availability. It is also contemplated in some instances to prepare a monovalent metal salt first and then to convert the same to the divalent metal salt by well-known double decomposition methods. However, it is preferred to use metal compounds which will react directly with the acid material to yield the desired salt.

In preparing the metallic salts, inert diluents are generally used to facilitate subsequent processing operations such as filtration and for centrifugation. Specific examples of such diluents are conventionally refined and solvent-refined mineral lubricating oil fractions, orthodichloro-benzene, alkylated diphenyl ethers, alkylated naphthalenes, di-octyl phthalates, cetane, etc. Such diluents can be added to the reaction mixture either prior to or after reaction of the acid material with the salt-forming reagent.

Below are two procedures whereby the salts of this invention may be conveniently prepared.

*Procedure "A".*—One gram-mole of an acid material is mixed with 3% of its weight of methanol and a 5 to 25% excess of the selected salt-forming reagent. The mixture is heated for about one hour at 50° to 70° C. at atmospheric pressure, and then for about 0.5 hour at 100° C. under reduced pressure, e. g. 10 to 100 mm. Hg absolute pressure. Thereafter, a diluent material may be added and the whole is filtered using "Hyflo," a well-known commercial siliceous filter-aid.

*Procedure "B".*—One gram-mole of an acid material is mixed with a diluent material and heated at 35–60° C. while a 5 to 25% excess of the selected salt-forming reagent is added. The whole is then stirred for about 2 hours at 65° C. under reduced pressure, e. g. 50 to 200 mm. Hg. absolute pressure. While the reaction mass is maintained at this temperature and pressure, water is added drop-wise and a distillate is continuously removed. The latter operation is continued for about 1.5 hours, then the water addition is stopped and the whole is heated to 95°–100° C. under reduced pressure, e. g. 50 to 200 mm. Hg absolute pressure, until distillation has substantially ceased. Thereafter, the material remaining in the flask is removed and filtered using "Hyflo," a filter-aid.

The following tables provide specific examples of preparations of dithiophosphate acid esters which come within the scope of the present invention. It is to be noted that the techniques used in praparing the acid materials are designated as the "batch" and "circulatory" processes, and these processes are described hereinabove.

The methods used in preparing the salts are designated as "Reaction Procedures A and B" and these procedures bearing similar letters have been described above. Furthermore in Table V, the mineral oil used have the following identities. SSU-100 is a conventionally refined midcontinent pale oil having a viscosity of about 100 Saybolt Universal seconds at 100° F. SSU-160 is solvent refined midcontinent oil having a viscosity of about 160 Saybolt Universal seconds at 100° F. SG-100 is an acid-treated Mid-Continent oil having a viscosity of about 100 Saybolt Universal seconds at 100° F.

*Table III*

[Preparation of dithiophosphate acid esters containing mixed hydrocarbon radicals, said acids produced by the reaction of phosphorus pentasulfide with an alcohol mixture containing two or more alcohols]

| Ex. No. | Alcohol mixture employed | | | | | Phosphorus pentasulfide | | Reaction condition | | | Product | | | |
|---|---|---|---|---|---|---|---|---|---|---|---|---|---|---|
| | Alcohol(s) containing less than 6 carbon atoms | | | Alcohol(s) containing at least 6 carbon atoms | | | | | | | | | | |
| | Identity | Gram-moles | Grams | Identity | Gram-moles | Grams | Gram-moles | Grams | Hours | Temperature, °C. | Fashion | Grams | Appearance | Acid number | Conversion value |
| 1 | Methanol | 3.7 | 375.0 | Octanol | 9.0 | 1,124 | 4.95 | 1,100 | 2.5 | 65 | Circulatory | 1,950 | Dark purple fluid. | 155 | 91.2 |
| 2 | do | 7.35 | 750.0 | do | 6.0 | 750 | 4.95 | 1,100 | 2.5 | 75 | do | 1,910 | do | 170 | 96.9 |
| 3 | do | 5.5 | 563.0 | Cyclohexanol | 3.75 | 375 | 4.95 | 1,100 | 2.5 | 75 | do | 1,980 | Dark green fluid. | 144 | 90.7 |
| | | | | Diisobutyl-cyclohexanol. | 2.35 | 563 | | | | | | | | | |
| 4 | do | 5.5 | 563.0 | Cyclohexanol | 3.75 | 375 | 4.95 | 1,100 | 2.5 | 60 | do | 1,910 | do | 156 | 90.0 |
| | | | | 3,5,5-Trimethyl-hexanol. | 3.86 | 563 | | | | | | | | | |
| 5 | Isopropanol | 3.33 | 200.0 | Methyl-cyclohexanol | 1.75 | 200 | 1.27 | 283 | 4.0 | 70-80 | Batch | 611 | do | 195 | 84.9 |
| 6 | do | 3.25 | 195.8 | do | 1.14 | 130.5 | 1.0 | 222 | 2.0 | 96 | do | 501 | do | 265 | 100.0 |
| 7 | do | 2.93 | 176.0 | sec-Butanol | 0.79 | 58.8 | 1.0 | 222 | 2.0 | 96 | do | 545 | do | 216 | 88.6 |
| | | | | Methyl-cyclohexanol. | 0.52 | 58.8 | | | | | | | | | |
| 8 | do | 3.38 | 202.8 | do | 1.77 | 190.2 | 1.0 | 222 | 2.0 | 96 | do | 483 | do | 216 | 92.0 |
| 9 | Allyl alcohol | 1.0 | 58.0 | 4-methyl-pentanol-2. | 3.0 | 306 | 1.0 | 222 | 3.0 | 80-100 | do | 444 | Brown-green fluid. | 161 | 80.5 |
| 10 | do | 3.0 | 174.0 | do | 3.0 | 306 | 1.5 | 333 | 20.0 | 90 | do | 476 | Yellow-brown fluid. | 93 | (¹) |
| 11 | n-Butanol | 9.5 | 700.0 | | | | 9.5 | 2,100 | 5.0 | 42-43 | Circulatory | 3,400 | Dark liquid | 162 | 67.0 |
| | Isobutanol | 28.3 | 2,100 | | | | | | | | | | | | |
| 12 | Isobutanol | 3.38 | 250.0 | Methyl-cyclohexanol. | 2.19 | 250 | 1.39 | 310 | 4.0 | 90-100 | Batch | 739 | Dark green fluid. | 177 | 92.2 |
| 13 | Sec-butanol | 1.41 | 104.0 | do | 2.74 | 312 | 1.0 | 222 | 1.0 | 96 | do | 603 | do | 174 | 91.5 |
| 14 | do | 1.89 | 140.0 | do | 2.28 | 260 | 1.0 | 222 | 2.0 | 96 | do | 566 | do | 177 | 91.3 |
| 15 | do | 2.11 | 156.8 | do | 2.06 | 235.2 | 1.0 | 222 | 2.0 | 96 | do | 574 | do | 189 | 95.5 |
| 16 | do | 2.33 | 172.8 | do | 1.85 | 211.2 | 1.0 | 222 | 2.0 | 96 | do | 563 | do | 175 | 87.3 |
| 17 | do | 3.38 | 250.0 | do | 2.19 | 250 | 1.39 | 310 | 4.0 | 90-100 | do | 721 | do | 184 | 90.2 |
| 18 | do | 2.85 | 211.2 | do | 1.52 | 172.8 | 1.0 | 222 | 2.0 | 96 | do | 568 | do | 178 | 92.5 |
| 19 | Pentanol-2 | 12.6 | 1,125 | 4-Methyl-pentanol-2. | 11.0 | 1,125 | 9.0 | 2,000 | 2.5 | 96 | Circulatory. | 4,051 | do | 177 | 90.0 |
| | | | | Cyclohexanol | 7.5 | 750 | | | | | | | | | |
| 20 | | | | 4-Methyl-pentanol-2. | 5.15 | 5,250 | 25.3 | 5,600 | 2.0 | 94 | do | 10,000 | Dark liquid | 171 | 92.0 |
| | | | | Cyclohexanol | 17.5 | 1,750 | | | | | | | | | |

¹ Conversion value not valid because of partial polymerization of the acid mass.

*Table IV*

[Preparation of dithiophosphate acid esters in which both of the hydrocarbon radicals are the same, said acids produced by the reaction of phosphorus pentasulfide with an alcohol]

| Example number | Alcohol employed | | | Phosphorus pentasulfide | | Reaction conditions | | | Product | | | |
|---|---|---|---|---|---|---|---|---|---|---|---|---|
| | Identity | Gram-moles | Grams | Gram-moles | grams | Hours | Temp., °C. | Fashion | Grams | Appearance | Acid number | Conversion value |
| 21 | Isopropanol | 6.66 | 400 | 1.68 | 370 | 4.0 | 90-100 | Batch | 686 | Dark green fluid | 228 | 87.5 |
| 22 | do | 100 | 6,000 | 24.8 | 5,500 | 3.0 | 55 | Circulatory | 8,000 | Dark liquid | 225 | 86.1 |
| 23 | do | 6.3 | 464 | 1.0 | 222 | 4.0 | 90-100 | Batch | 730 | Dark green fluid | 108 | 85.9 |
| 24 | do | 35.40 | 2,620 | 9.0 | 2,000 | 4.0 | 46-48 | Circulatory | 3,022 | Dark liquid | 186 | 80.5 |
| 25 | Sec-butanol | 8.0 | 592 | 2.0 | 444 | 6.0 | 90-100 | Batch | 966 | Dark green fluid | 203 | 87.9 |
| 26 | do | 189 | 14,000 | 45.0 | 10,000 | 4.5 | 43 | Circulatory | 18,500 | Black liquid | 185 | 80.2 |
| 27 | 4-methyl-pentanol-2 | 68.50 | 7,000 | 25.2 | 5,600 | 3.0 | 94 | do | 10,000 | Dark liquid | 170 | 90.6 |
| 28 | Methyl-cyclohexanol | 28.00 | 3,200 | 6.85 | 1,513 | 2.0 | 100 | Batch | 3,961 | Black liquid | 174 | 99.5 |
| 29 | Octanol-2 | 30.80 | 4,000 | 6.16 | 1,370 | 4.0 | 95-100 | Circulatory | 5,117 | Dark green fluid | 136 | 87.0 |
| 30 | 3,5,5-trimethyl-hexanol | 17.10 | 2,500 | 9.0 | 2,000 | 4.0 | 96-98 | Circulatory | 3,030 | do | 128 | 90.0 |
| 31 | Lauryl alcohol | 5.0 | 932 | 1.0 | 222 | 2.0 | 100 | Batch | 1,012 | Brown liquid | 90 | 75.0 |
| 32 | Cetyl alcohol | 4.0 | 970 | 1.0 | 222 | 4.5 | 85-100 | do | 1,068 | Dark green oil | 85 | 87.0 |

Table V

[Preparation of salts of dithiophosphate acid esters, in which salts a proportion of the hydrocarbon radicals present consist of (a) aliphatic radicals having less than 6 carbon atoms, and (b) aliphatic and/or cycloaliphatic radicals having at least 6 carbon atoms. Under "Reaction Procedure" the letters A and B refer to the correspondingly identified procedures set forth in detail earlier in the specification.]

| Ex. No. | Dithiophosphate acid ester | | | Mineral oil | | Salt-forming reagent | | Percent molal excess | Reaction procedure | Percent mineral oil present | Grams product | Appearance (at room temperature) | Analysis | | |
|---|---|---|---|---|---|---|---|---|---|---|---|---|---|---|---|
| | Identity | Grams | Mole percent | Identity | Grams | Identity | Grams | | | | | | Percent S | Percent P | Percent metal |
| 33 | Mixed acid of ex. 1 | 1,200 | ------ | SG-100 oil | 657 | ZnO | 159 | 15 | A | 33.4 | 1,527 | Dark brown fluid. | 13.6 | 5.70 | 6.15 |
| 34 | Single acid of ex. 22 | 114 | 10 | SSU-120 oil | 1,116 | ZnO | 220 | 15 | B | 40.2 | 2,770 | Light amber fluid. | ------ | 5.33 | ------ |
| | Single acid of ex. 27 | 1,386 | 90 | | | | | | | | | | | | |
| 35 | Single acid of ex. 22 | 400 | 10 | None | ------ | ZnO | 828 | 10 | B | ------ | 5,835 | ----do---- | 20.1 | 9.42 | 9.96 |
| | Single acid of ex. 27 | 4,900 | 90 | | | | | | | | | | | | |
| 36 | Single acid of ex. 22 | 114.8 | 10 | SSU-120 oil | 1,145 | ZnO | 222 | 15 | B | 40.9 | 2,800 | ----do---- | ------ | 5.49 | ------ |
| | Mixed acid of ex. 20 | 1,385.2 | 90 | | | | | | | | | | | | |
| 37 | Single acid of ex. 22 | 472 | 40 | SG-100 oil | 1,244 | ZnO | 233 | 15 | B | 42.2 | 2,151 | ----do---- | 12.85 | 5.65 | 6.17 |
| | Single acid of ex. 24 | 151 | 10 | | | | | | | | | | | | |
| | Single acid of ex. 27 | 925 | 50 | | | | | | | | | | | | |
| 38 | Single acid of ex. 22 | 472 | 40 | ---do--- | 1,222 | ZnO | 233 | 15 | B | 41.4 | 2,437 | ----do---- | 12.4 | 5.78 | 6.32 |
| | Mixed acid of ex. 11 | 173 | 10 | | | | | | | | | | | | |
| | Single acid of ex. 27 | 925 | 50 | | | | | | | | | | | | |
| 39 | Single acid of ex. 22 | 472 | 40 | ---do--- | 1,235 | ZnO | 233 | 15 | B | 41.8 | 2,337 | ----do---- | 12.9 | 5.93 | 6.42 |
| | Mixed acid of ex. 11 | 345 | 20 | | | | | | | | | | | | |
| | Single acid of ex. 27 | 740 | 40 | | | | | | | | | | | | |
| 40 | Single acid of ex. 22 | 472 | 40 | ---do--- | 1,247 | ZnO | 233 | 15 | B | 42.2 | 2,369 | ----do---- | 13.2 | 5.90 | 6.45 |
| | Mixed acid of ex. 11 | 577 | 30 | | | | | | | | | | | | |
| | Single acid of ex. 27 | 555 | 30 | | | | | | | | | | | | |
| 41 | Single acid of ex. 22 | 472 | 40 | ---do--- | 1,348 | ZnO | 233 | 15 | B | 45.6 | 2,245 | ----do---- | 12.4 | 5.58 | 6.20 |
| | Single acid of ex. 24 | 602 | 40 | | | | | | | | | | | | |
| | Single acid of ex. 27 | 370 | 20 | | | | | | | | | | | | |
| 42 | Single acid of ex. 22 | 472 | 40 | ---do--- | 1,260 | ZnO | 233 | 15 | B | 42.6 | 2,356 | ----do---- | 13.5 | 5.63 | 6.32 |
| | Mixed acid of ex. 11 | 690 | 40 | | | | | | | | | | | | |
| | Single acid of ex. 27 | 370 | 20 | | | | | | | | | | | | |
| 43 | Single acid of ex. 22 | 472 | 40 | ---do--- | 1,382 | ZnO | 233 | 15 | B | 46.7 | 2,074 | ----do---- | 11.6 | 5.28 | 5.78 |
| | Single acid of ex. 23 | 753 | 50 | | | | | | | | | | | | |
| | Single acid of ex. 27 | 185 | 10 | | | | | | | | | | | | |
| 44 | Single acid of ex. 22 | 472 | 40 | ---do--- | 1,270 | ZnO | 233 | 15 | B | 43.0 | 2,362 | ----do---- | 13.5 | 5.67 | 6.36 |
| | Mixed acid of ex. 11 | 865 | 50 | | | | | | | | | | | | |
| | Single acid of ex. 27 | 185 | 10 | | | | | | | | | | | | |
| 45 | Single acid of ex. 22 | 380 | 40 | ---do--- | 970 | ZnO | 187 | 15 | B | 41.0 | 1,737 | Amber fluid | 12.5 | 5.67 | 6.18 |
| | Single acid of ex. 27 | 888 | 60 | | | | | | | | | | | | |
| 46 | Single acid of ex. 22 | 472 | 40 | ---do--- | 1,244 | ZnO | 233 | 15 | B | 42.2 | 2,395 | ----do---- | 12.6 | 5.71 | 6.29 |
| | Single acid of ex. 26 | 151.5 | 10 | | | | | | | | | | | | |
| | Single acid of ex. 27 | 925 | 50 | | | | | | | | | | | | |
| 47 | Single acid of ex. 22 | 472 | 40 | ---do--- | 1,278 | ZnO | 233 | 15 | B | 43.3 | 2,319 | ----do---- | 12.2 | 5.44 | 6.15 |
| | Single acid of ex. 26 | 303 | 20 | | | | | | | | | | | | |
| | Single acid of ex. 27 | 740 | 40 | | | | | | | | | | | | |
| 48 | Single acid of ex. 22 | 472 | 40 | ---do--- | 1,311 | ZnO | 233 | 15 | B | 44.5 | 2,250 | ----do---- | 12.6 | 5.72 | 6.31 |
| | Single acid of ex. 26 | 454.5 | 30 | | | | | | | | | | | | |
| | Single acid of ex. 27 | 555 | 30 | | | | | | | | | | | | |
| 49 | Single acid of ex. 22 | 472 | 40 | ---do--- | 1,545 | ZnO | 233 | 15 | B | 45.5 | 2,300 | ----do---- | 12.4 | 5.81 | 6.26 |
| | Single acid of ex. 26 | 646 | 40 | | | | | | | | | | | | |
| | Single acid of ex. 27 | 370 | 20 | | | | | | | | | | | | |
| 50 | Single acid of ex. 22 | 424 | 45 | ---do--- | 990 | ZnO | 186 | 15 | B | 41.9 | 1,941 | ----do---- | 10.2 | 5.78 | 6.32 |
| | Single acid of ex. 27 | 816 | 55 | | | | | | | | | | | | |
| 51 | Single acid of ex. 22 | 448 | 47.5 | ---do--- | 996 | ZnO | 186 | 15 | B | 42.3 | 2,015 | ----do---- | 12.5 | 5.67 | 6.23 |
| | Single acid of ex. 27 | 776 | 52.5 | | | | | | | | | | | | |
| 52 | Single acid of ex. 22 | 472 | 50 | ---do--- | 1,018 | ZnO | 186 | 15 | B | 43.2 | 2,035 | ----do---- | 12.4 | 5.64 | 6.23 |
| | Single acid of ex. 27 | 740 | 50 | | | | | | | | | | | | |
| 53 | Mixed acid of ex. 5 | 610 | ------ | None | ------ | ZnO | 91 | 5 | A | ------ | 558 | Brown-green liquid. | 23.2 | 10.6 | 11.3 |
| 54 | Single acid of ex. 22 | 496 | 52.5 | SG-100 oil | 1,030 | ZnO | 186 | 15 | B | 43.6 | 2,009 | Amber fluid | 11.2 | 5.66 | 6.38 |
| | Single acid of ex. 27 | 704 | 47.5 | | | | | | | | | | | | |
| 55 | Single acid of ex. 21 | 400 | 57.5 | None | ------ | ZnO | 122 | 5 | A | ------ | 703 | Brown-green liquid. | 22.9 | 11.0 | 10.3 |
| | Single acid of ex. 28 | 400 | 42.5 | | | | | | | | | | | | |
| 56 | Mixed acid of ex. 6 | 501 | ------ | SSU-100 oil | 562 | ZnO | 80.3 | 5 | A | 50.0 | 921 | Green liquid | ------ | ------ | ------ |
| 57 | Mixed acid of ex. 12 | 739 | ------ | ------ | ------ | ZnO | 100 | 5 | A | ------ | 686 | Light brown liquid. | 22.1 | 9.93 | 9.55 |
| 58 | Single acid of ex. 22 | 450 | 54 | None | ------ | ZnO | 127 | 5 | A | ------ | 817 | Brown-green fluid. | 22.1 | 10.1 | 9.61 |
| | Single acid of ex. 28 | 450 | 46 | | | | | | | | | | | | |
| 59 | Mixed acid of ex. 13 | 347 | ------ | SSU-160 oil | 382 | ZnO | 46 | 5 | A | 50 | 566 | Green liquid | 9.70 | 4.83 | 4.54 |
| 60 | Mixed acid of ex. 14 | 558 | ------ | ---do--- | 593 | ZnO | 45.8 | 5 | A | 50 | 980 | ----do---- | 11.3 | 6.37 | ------ |
| 61 | Mixed acid of ex. 15 | 573 | ------ | ---do--- | 636 | ZnO | 82.3 | 5 | A | 50 | 1,111 | Amber liquid | 9.23 | 4.46 | 4.97 |
| 62 | Mixed acid of ex. 16 | 563 | ------ | ---do--- | 620 | ZnO | 74.7 | 5 | A | 50 | 1,041 | ----do---- | 10.3 | 4.70 | 5.24 |
| 63 | Mixed acid of ex. 17 | 721 | ------ | None | ------ | ZnO | 101 | 5 | A | ------ | 631 | Light brown fluid. | 21.4 | 10.2 | 9.70 |
| 64 | Single acid of ex. 25 | 296 | 54.5 | ------ | ------ | ZnO | 85 | 5 | A | ------ | 565 | ----do---- | 21.8 | 10.1 | 9.70 |
| | Single acid of ex. 28 | 296 | 45.5 | | | | | | | | | | | | |
| 65 | Mixed acid of ex. 18 | 567 | ------ | SSU-160 oil | 626 | ZnO | 76.7 | 5 | A | 50 | 981 | Clear red liquid. | 10.9 | 4.96 | 4.86 |
| 66 | Single acid of ex. 26 | 910 | 60 | SG-100 oil | 1,305 | ZnO | 233 | 15 | B | 44.2 | 2,212 | Amber fluid | 11.4 | 5.50 | 5.93 |
| | Single acid of ex. 27 | 740 | 40 | | | | | | | | | | | | |
| 67 | Single acid of ex. 26 | 1,060 | 70 | ---do--- | 1,178 | ZnO | 233 | 15 | B | 40.0 | 2,263 | ----do---- | 12.5 | 5.78 | 6.25 |
| | Single acid of ex. 27 | 555 | 30 | | | | | | | | | | | | |
| 68 | Single acid of ex. 26 | 1,212 | 80 | ---do--- | 1,211 | ZnO | 233 | 15 | B | 41.0 | 2,209 | ----do---- | 12.3 | 5.68 | 6.09 |
| | Single acid of ex. 27 | 370 | 20 | | | | | | | | | | | | |
| 69 | Mixed acid of ex. 19 | 1,200 | ------ | None | ------ | Ba(OH)$_2$ | 378 | 5 | A | ------ | 1,550 | Light green solid. | 16.5 | 8.10 | 17.0 |
| 70 | Single acid of ex. 29 | 500 | 62.5 | SG-100 oil | 807 | CdO | 131 | 5 | A | 50 | 1,530 | Brown liquid | 7.70 | 3.70 | 6.70 |
| | Single acid of ex. 25 | 200 | 37.5 | | | | | | | | | | | | |
| 71 | Single acid of ex. 30 | 500 | 61 | ---do--- | 721 | MgO | 40 | 5 | A | 50 | 1,342 | Green liquid | 8.20 | 4.00 | 1.50 |
| | Single acid of ex. 25 | 200 | 39 | | | | | | | | | | | | |
| 72 | Single acid of ex. 31 | 500 | 52.5 | SSU-160 oil | 729 | Ca(OH)$_2$ | 63 | 10 | A | 50 | 1,348 | Brown liquid | 6.70 | 3.10 | 2.10 |
| | Single acid of ex. 25 | 200 | 47.5 | | | | | | | | | | | | |

It will be noted that in the dithiophosphate materials employed in Examples 37 to 42 inclusive, 45 to 52 inclusive, etc., the ratio of carbon to phosphorus atoms is between 8:1 and 9.6:1. It will be further noted that in the dithiophosphate materials employed in Examples 43 and 44 the ratio of carbon to phosphorus atoms is 7.6:1.

The dithiophosphate materials of this invention are exceptionally stable in mineral oils after standing for long periods of time. Stability as used herein means that the material does not become oil-insoluble either with or without undergoing chemical decomposition. Heretofore, it was believed that short chain length organic substituents in the dithiophosphate material were undesirable because of the adverse effects on oil solubility of the material. Now, however, by means of the data given hereinbelow, it can be seen that substantially stable dithiophosphate materials can be produced which can contain organic substituents of less than six carbon atoms in the aliphatic chain. This makes possible the production of much cheaper dithiophosphate materials than was possible heretofore.

In Tables VI and VII below, the stability of the novel dithiophosphate materials of this invention is illustrated.

Table VI

[Stability tests on zinc salts of dithiophosphate acid esters]

| Zinc salt of dithiophosphate acid ester | | | | Stability of salt tested in an oven at 100° C. for a maximum of 15 days, observing appearance daily of a 5% by volume blend of concentrate in Pennsylvania conventionally refined neutral oil having a viscosity of about 150 Saybolt seconds at 100° F. | |
|---|---|---|---|---|---|
| Prepared from a single alcohol; organic radical in said salt (40% SSU-100 oil present to yield a concentrate) | Prepared from a plurality of alcohols, at least one of which contains 6 or more carbon atoms and at least one of which contains less than 6 carbon atoms | | | Blend | |
| | Example No. of salt | Organic radicals in said salt | | Days | Result |
| | | Identity of radicals | Mole percent | | |
| Group I: | | | | | |
| Isopropyl | | | | (Initially insoluble at test concentration) | |
| 4-methyl-pentyl-2 | | | | 5 | Heavy precipitate. |
| | 34 | Isopropyl<br>4-methyl-pentyl-2 | 10<br>90 | 15 | Clear. |
| | 35 | Isopropyl<br>4-methyl-pentyl-2 | 10<br>90 | 15 | Do. |
| | 45 | Isopropyl<br>4-methyl-pentyl-2 | 40<br>60 | 15 | Do. |
| | 50 | Isopropyl<br>4-methyl-pentyl-2 | 45<br>55 | 15 | Slight precipitate. |
| | 51 | Isopropyl<br>4-methyl-pentyl-2 | 47.5<br>52.5 | 15 | Do. |
| | 52 | Isopropyl<br>4-methyl-pentyl-2 | 50<br>50 | 15 | Do. |
| Group II: | | | | | |
| Isopropyl | | | | (Initially insoluble at test concentration) | |
| 4-methyl-pentyl-2 | | | | 5 | Heavy precipitate. |
| Cyclohexyl | | | | (Initially insoluble at test concentration) | |
| | 36 | Isopropyl<br>4-methyl-pentyl-2<br>Cyclohexyl | 10<br>20<br>70 | 15 | Clear. |
| Group III: | | | | | |
| Isopropyl | | | | (Initially insoluble at test concentration) | |
| 4-methyl-pentyl-2 | | | | 5 | Heavy precipitate. |
| Isobutyl | | | | 9 | Do. |
| | 37 | Isopropyl<br>Isobutyl<br>4-methyl-pentyl-2 | 40<br>10<br>50 | 15 | Clear. |
| | 43 | Isopropyl<br>Isobutyl<br>4-methyl-pentyl-2 | 40<br>50<br>10 | 15 | Do. |
| Group IV: | | | | | |
| Isopropyl | | | | (Initially insoluble at test concentration) | |
| n-Butyl | | | | 1 | Heavy precipitate. |
| Isobutyl | | | | 9 | Do. |
| 4-methyl-pentyl-2 | | | | 5 | Do. |
| | 38 | Isopropyl<br>n-Butyl<br>Isobutyl<br>4-methyl-pentyl-2 | 40<br>2.5<br>7.5<br>50 | 15 | Clear. |
| | 40 | Isopropyl<br>n-Butyl<br>Isobutyl<br>4-methyl-pentyl-2 | 40<br>7.5<br>22.5<br>30 | 15 | Do. |
| | 44 | Isopropyl<br>n-Butyl<br>Isobutyl<br>4-methyl-pentyl-2 | 40<br>12.5<br>37.5<br>10 | 15 | Do. |
| Group V: | | | | | |
| Isopropyl | | | | (Initially insoluble at test concentration) | |
| Isobutyl | | | | 9 | Heavy precipitate. |
| 4-methyl-pentyl-2 | | | | 5 | Do. |
| | 41 | Isopropyl<br>Isobutyl<br>4-methyl-pentyl-2 | 40<br>40<br>20 | 15 | Clear. |

Table VI—Continued

| Zinc salt of dithiophosphate acid ester | | | | Stability of salt tested in an oven at 100° C. for a maximum of 15 days, observing appearance daily of a 5% by volume blend of concentrate in Pennsylvania conventionally refined neutral oil having a viscosity of about 150 Saybolt seconds at 100° F. | |
|---|---|---|---|---|---|
| Prepared from a single alcohol; organic radical in said salt (40% SSU-100 oil present to yield a concentrate) | Prepared from a plurality of alcohols, at least one of which contains 6 or more carbon atoms and at least one of which contains less than 6 carbon atoms | | | Blend | |
| | Example No. of salt | Organic radicals in said salt | | Days | Result |
| | | Identity of radicals | Mole percent | | |
| Group VI: | | | | | |
| Isopropyl | | | | (Initially insoluble at test concentration) | |
| Sec-butyl | | | | 15 | Heavy precipitate. |
| 4-methyl-pentyl-2 | | | | 5 | Do. |
| | 46 | Isopropyl | 40 | 15 | Clear. |
| | | Sec-butyl | 10 | | |
| | | 4-methyl-pentyl-2 | 50 | | |
| | 47 | Isopropyl | 40 | 15 | Slight precipitate. |
| | | Sec-butyl | 20 | | |
| | | 4-methyl-pentyl-2 | 40 | | |
| | 48 | Isopropyl | 40 | 15 | Do. |
| | | Sec-butyl | 30 | | |
| | | 4-methyl-pentyl-2 | 30 | | |
| Group VII: | | | | | |
| Sec-butyl | | | | 15 | Do. |
| 4-methyl-pentyl-2 | | | | 5 | Do. |
| | 66 | Sec-butyl | 60 | 15 | Clear. |
| | | 4-methyl-pentyl-2 | 40 | | |
| | 68 | Sec-butyl | 80 | 15 | Do |
| | | 4-methyl-pentyl-2 | 20 | | |

Table VII

[Solubility tests on zinc salts of dithiophosphate acid esters.]

| Zinc salt of dithiophosphate acid esters | | | | Solubility of salt in Pennsylvania conventionally refined neutral oil having a viscosity of about 150 Saybolt seconds at 100° F.; percent of concentrate tested and appearance of the oil solution after 1 month storage at room temperature | | |
|---|---|---|---|---|---|---|
| Prepared from a single alcohol; organic radical in said salt (40% SSU-100 oil present to yield a concentrate) | Prepared from a plurality of alcohols, at least one of which contains 6 or more carbon atoms and at least one of which contains less than 6 carbon atoms | | | | | |
| | Example No. of salt | Organic radicals in said salt | | 50% | 10% | 1% |
| | | Identity of radicals | Mole percent | | | |
| Group I: | | | | | | |
| Sec-butyl | | | | Precipitated | Precipitated | Precipitated. |
| Methyl-cyclohexyl | | | | Clear | do | Do. |
| | 59 | Sec-butyl | 34 | do | Clear | Clear. |
| | | Methyl-cyclohexyl | 66 | | | |
| | 60 | Sec-butyl | 45 | do | do | Slight sediment. |
| | | Methyl-cyclohexyl | 55 | | | |
| | 61 | Sec-butyl | 50.5 | do | do | Clear. |
| | | Methyl-cyclohexyl | 49.5 | | | |
| | 62 | Sec-butyl | 56 | do | do | Do. |
| | | Methyl-cyclohexyl | 44 | | | |
| | 65 | Sec-butyl | 65 | do | do | Do. |
| | | Methyl-cyclohexyl | 35 | | | |
| Group II: | | | | | | |
| Isopropyl | | | | (Initially insoluble at test concentration) | | |
| Methyl-cyclohexyl | | | | Clear | Precipitated | Precipitated. |
| | 53 | Isopropyl | 65 | do | Slight sediment | Clear. |
| | | Methyl-cyclohexyl | 35 | | | |

The above data clearly indicates that the novel dithiophosphate salt-ester materials of this invention are stable in mineral oil solutions after long periods of storage notwithstanding the presence of substantial amounts of aliphatic hydrocarbon radicals of less than six carbon atoms, just so long as there are also present hydrocarbon radicals of at least six carbon atoms. Generally, the aliphatic hydrocarbon radicals can be present in amounts as high as 90% and as low as 10%, more usually materials containing such radicals in amounts of about 30 to 50% will be found. In such situations the remainder of the radicals contain at least six carbon atoms and are selected from the group consisting of aliphatic and cycloaliphatic hydrocarbon radicals.

In addition to the unexpected finding of the stability of my novel dithiophosphate salt-ester materials in mineral oils, it was discovered that such materials are at least as effective as corrosion inhibitors in lubricants when employing lesser amounts on a weight basis than those materials in which all the hydrocarbon substituents are at least six carbon atoms. This unusual property of my novel materials is illustrated by the data given in the table below. The test samples were investigated in a Chevrolet engine in accordance with the procedure described in Co-ordinating Research Council Test Procedure, CRC L-4-545, May 1945.

Table VIII

| Ex. No. | Composition | Chevrolet engine test average mg. loss per whole bearing |
|---|---|---|
| 1 | SAE 30 solvent extracted midcontinent base oil-viscosity index of 95, plus: 0.95 weight percent of Example No. 45 in Table V | 19, repeat test 13. |
| 2 | SAE 30 solvent extracted midcontinent base oil-viscosity index of 95, plus: 0.92 weight percent of Example No. 68 in Table V | 8. |
| 3 | SAE 30 solvent extracted midcontinent base oil-viscosity index of 95, plus: 1.07 weight percent zinc di-(4-methyl-pentyl-2) dithiophosphate. | 35, repeat test 41. |
| 4 | SAE 30 solvent extracted midcontinent base oil-viscosity index of 85, plus: 0.53 weight percent of Example No. 45 in Table V | 47. |
| 5 | SAE 30 solvent extracted midcontinent oil-viscosity index 85 plus: 0.67 weight percent of zinc dithiophosphate acid ester derived from mixed dithiophosphate acid ester which is prepared by reacting 4 moles of mixture of equal parts by weight of methylcyclohexanol and capryl alcohol with 1 mole of $P_2S_5$ at 100° C. for 4 hours. | 122. |

Considering Examples 4 and 5 in Table VIII, wherein the same base oil was employed, it can be seen that 24.5% more of dithiophosphate salt-ester was used in Example 5 than in Example 4, but still, the dithiophosphate salt-ester material of this invention is more effective than the prior art material with respect to corrosion inhibition. On the other hand, when comparing Examples 1, 2 and 3, in which the same base oil was used, 12.5% more dithiophosphate salt-ester was used in Example 3 than in Example 1; whereas 16.3% more dithiophosphate salt-ester was used in Example 3 than in Example 2. Notwithstanding the use of greater quantities of dithiophosphate salt-esters containing only radicals of at least six carbon atoms, the corrosion inhibiting effect thereof is less than what is obtained with the dithiophosphate salt-esters produced in accordance with the present invention.

As noted above, the novel dithiophosphate salt-esters of this invention are useful in lubricating oils. However, it should be understood that my novel materials can be used for a variety of purposes such as for example in crankcase oils, torque-converter oils, gear oils, turbine oils, turbo-jet oils, cutting oils, rolling mill lubricants, rock-drilling lubricants, greases, etc.; as well as for non-lubricating purposes e. g. transformer oils, hydraulic oils, plastics, flotation agents, hydrocarbon fuels such as gasoline, fuel oil, furnace oil, etc. Generally, the novel dithiophosphate salt-ester materials of this invention will find use in lubricating oils in amounts of from about 0.05 to 10%, more usually from about 0.1 to 7.5% and preferably from about 0.2 to 5%, based on the weight of the oil.

In the light of the foregoing description of my invention as broadly defined and as illustrated by specific examples, it will be noted that the novel product which I have produced may be defined as an oil-soluble organic dithiophosphate material, in which material there is present a substantial proportion of each of: (1) aliphatic radicals having less than six carbon atoms, and (2) organic radicals having at least six carbon atoms and selected from the class consisting of aliphatic and cycloaliphatic radicals and in which material all of said radicals present are derived from organic hydroxyl bodies having an ionization constant less than $1 \times 10^{-6}$ at 25° C.

For certain uses, and particularly as lubricant additives, superior results have usually been obtained when the salt-forming radical employed in the preparation of dithiophosphate salt-ester materials of the present invention is selected from the metals in group II of the periodic table of elements, and especially where the salt-forming radical is zinc. Further, it has been found that dithiophosphate materials which have an average of from 8 to 9.6 carbon atoms per atom of phosphorus will be found to be preferable for many uses.

Other modes of applying the principle of the invention may be employed, change being made as regards the details described, provided the features stated in any of the following claims, or the equivalent of such, be employed.

I therefore particularly point out and distinctly claim as my invention:

1. As a composition of matter the oil-soluble group II metal salts of a mixture of simple di-esters of dithiophosphoric acids, one of said di-esters having the formula

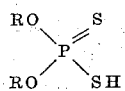

where R is selected from the group consisting of saturated aliphatic and cycloaliphatic radicals having less than six carbon atoms, and another of said di-esters having the formula

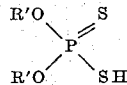

where R' is selected from the group consisting of saturated aliphatic and cycloaliphatic radicals having at least six carbon atoms, said mixture of simple di-esters being characterized in that the ratio of carbon atoms to phosphorus atoms in said mixture is within the range of about 7.6:1 to about 9.6:1.

2. The group II metal salts of claim 1 characterized further in that the saturated alcohols are alkanols.

3. The group II metal salts of claim 1 characterized further in that the saturated alcohol having less than six carbon atoms is a propyl alcohol.

4. The group II divalent metal salts of claim 1 characterized further in that the saturated alcohol having at least six carbon atoms is a hexyl alcohol.

5. The group II divalent metal salts of claim 1 characterized further in that the saturated alcohol having less than six carbon atoms is isopropyl alcohol and the saturated alcohol having at least six carbon atoms is 4-methyl-pentanol-2.

6. The group II divalent metal salts of claim 1 characterized further in that the divalent metal is zinc.

7. The group II divalent metal salts of claim 1 characterized further in that the saturated alcohol is an alkanol and the group II divalent metal is zinc.

8. The zinc salts of claim 7 characterized further in that the alkanol having less than six carbon atoms is isopropyl alcohol and the alkanol having at least six carbon atoms is 4-methylpentanol-2.

9. The zinc salts of claim 8 characterized further in that the ratio of carbon atoms to phosphorus atoms is about 9.6:1.

10. As a composition of matter the oil-soluble group II metal salts of a mixture of three di-esters of dithiophosphoric acids, and of said di-esters having the formula

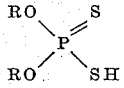

where R is selected from the group consisting of saturated aliphatic and cycloaliphatic radicals having less than 6 carbon atoms, the second of said di-esters having the formula

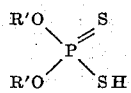

where R' is selected from the group consisting of saturated aliphatic and cycloaliphatic radicals having at least 6 carbon atoms, and the third of said di-esters having the formula

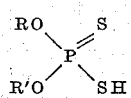

said mixture of di-esters being characterized in that the ratio of carbon atoms to phosphorus atoms in said mixture is within the range of about 7.6:1 to about 9.6:1.

11. As a composition of matter the oil-soluble group II metal salts of a mixture of di-esters of dithiophosphoric acids, one of said di-esters having the formula

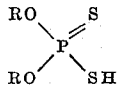

where R is selected from the group consisting of saturated aliphatic and cycloaliphatic radicals having less than 6 carbon atoms, the second of said di-esters having the formula

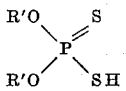

where R' is selected from the group consisting of saturated aliphatic and cycloaliphatic radicals having at least 6 carbon atoms, and the third of said di-esters having the formula

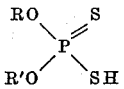

said mixture of di-esters being characterized in that the ratio of carbon atoms to phosphorus atoms in said mixture is within the range of about 7.6:1 to about 9.6:1, said mixture of di-esters being further characterized in that at least 50% of the mixture consists of simple di-esters.

References Cited in the file of this patent

UNITED STATES PATENTS

| | | |
|---|---|---|
| 2,370,080 | Schreiber | Feb. 20, 1945 |
| 2,373,811 | Cook | Apr. 17, 1945 |
| 2,387,538 | Smith | Oct. 23, 1945 |
| 2,501,731 | Mertes | Mar. 28, 1950 |
| 2,579,037 | Evans | Dec. 18, 1951 |
| 2,579,038 | Evans | Dec. 18, 1951 |
| 2,680,123 | Mulvany | June 1, 1954 |